United States Patent [19]

Cooper et al.

[11] Patent Number: 4,866,763

[45] Date of Patent: Sep. 12, 1989

[54] INTEREXCHANGE CARRIER AUTOMATIC ROUTE SELECTION SYSTEM

[75] Inventors: Bret A. Cooper, Columbus; William H. Havanas, Reynoldsburg, both of Ohio; Thomas R. Lanning, Chelmsford, Mass.; Mark A. Martinka, Pickerington, Ohio

[73] Assignee: American Telephone and Telegraph Company, AT&T Bell Laboratories, Murray Hill, N.J.

[21] Appl. No.: 232,966

[22] Filed: Aug. 17, 1988

[51] Int. Cl.[4] ................ H04M 3/42; H04M 7/00
[52] U.S. Cl. ................................ 379/221; 379/201
[58] Field of Search ............ 379/201, 207, 220, 221, 379/225, 229, 112, 113

[56] References Cited

U.S. PATENT DOCUMENTS

| | | | |
|---|---|---|---|
| 4,555,594 | 11/1985 | Friedes et al. | 379/220 |
| 4,565,903 | 1/1986 | Riley | 379/220 |
| 4,577,066 | 3/1986 | Bimonte et al. | 379/221 |
| 4,611,094 | 9/1986 | Asmuth et al. | 379/201 X |
| 4,685,127 | 8/1987 | Miller et al. | 379/221 |
| 4,695,977 | 9/1987 | Hansen et al. | 364/900 |
| 4,747,127 | 5/1988 | Hansen et al. | 379/94 |
| 4,748,658 | 5/1988 | Gopal et al. | 379/221 |
| 4,791,665 | 12/1988 | Bogart et al. | 379/221 X |

Primary Examiner—James L. Dwyer
Attorney, Agent, or Firm—Dwight A. Marshall

[57] ABSTRACT

A system for selecting multiple interexchange carriers serving telephone switches interconnecting user telephone lines. Apparatus and a method interactive with telephone users creates data base records of user selected interchange carrier resources and encodes the user created data base records into telephone switch messages. The telephone switch messages are transmitted to telephone switches to enable the telephone switches to selectively interconnect user telephone lines with ones of the interchange carrier resources in accordance with user created data base records.

22 Claims, 8 Drawing Sheets

GROUP ARS001      INDEX 1        DIGITS     DATE  9/30 7:33  3/03 11:15

9AM to 11AM    11AM to 1PM    1PM to 5PM    5PM to 9AM    9AM to 9AM
MON to FRI     MON to FRI     MON to FRI    MON to FRI    SAT to MON

AT&T-7         AT&T-6         WATS-1        AT&T-5        AT&T-5
CARRIER-7      REORDER        WATS-2        CARRIER-7     REORDER
CARRIER-8                     AT&T-5        REORDER
REORDER                       CARRIER-7
                              CARRIER-6
                              REORDER
```

INTEREXCHANGE CARRIER AUTOMATIC ROUTE SELECTION SYSTEM

TECHNICAL FIELD

The invention relates to apparatus and a method for selecting interexchange carrier resources serving telephone exchange areas.

Background and Problem

Interexchange carriers, such as the American Telephone and Telegraph Company, provide resources such as communication facilities between local telephone exchange areas. A telephone user normally selects an interexchange carrier and informs the telephone company serving the user's local telephone exchange area that the user's toll calls are to be completed by the selected interexchange carrier. The telephone company issues an order to install the user interexchange carrier information in telephone switch equipment serving the user. Subsequent toll and interexchange calls dialed by the user are completed by the telephone switch equipment connecting the user line to the selected interexchange carrier facilities.

A user may like to have access to various features offered by interexchange carriers provided by the telephone switch equipment, hereinafter identified as a telephone switch, serving the user and to be able to select various interexchange carrier resources at the option of the user. For example, a user will often have different requirements during the days of the week and during the hours of each day. It would be advantageous for a user to be able to select multiple interexchange carrier resources in an interaction with the telephone network such that the user could create route records defining ones of the available interexchange carrier resources that would enable a telephone switch to interconnect user lines with the interexchange carrier resources in accordance with the user's daily and hourly requirements. A problem arises in the present public telephone network in that a user must first notify the user's telephone company and the telephone company must issue an order to install the user selected interexchange carrier information in the telephone switch serving the user thus restricting user access to the wide range of interexchange carrier resources that may be available at the telephone switch serving the user.

Solution

The foregoing problems are solved and the public telephone network is enhanced by apparatus and a method for enabling users in an interaction with the apparatus to select multiple interexchange carrier resources and construct data base records that enables a telephone switch to interconnect user lines with ones of the interexchange carrier resources in accordance with the user constructed data base records.

A system in accordance with the principles of the invention generates a data base defining multiple interexchange carrier resources that are available for use by a user at telephone switches interconnected with the user lines. The system is interactive with the user for creating data base records of ones of the interexchange carrier resources selected by the user from the generated data base. Each user created data base record is encoded into telephone switch code language messages that are transmitted to telephone switches interconnected with the user lines to enable the telephone switches to selectively interconnect the user lines with interexchange carrier routes defined by the user created data base records.

DETAILED DESCRIPTION

Figure 1:
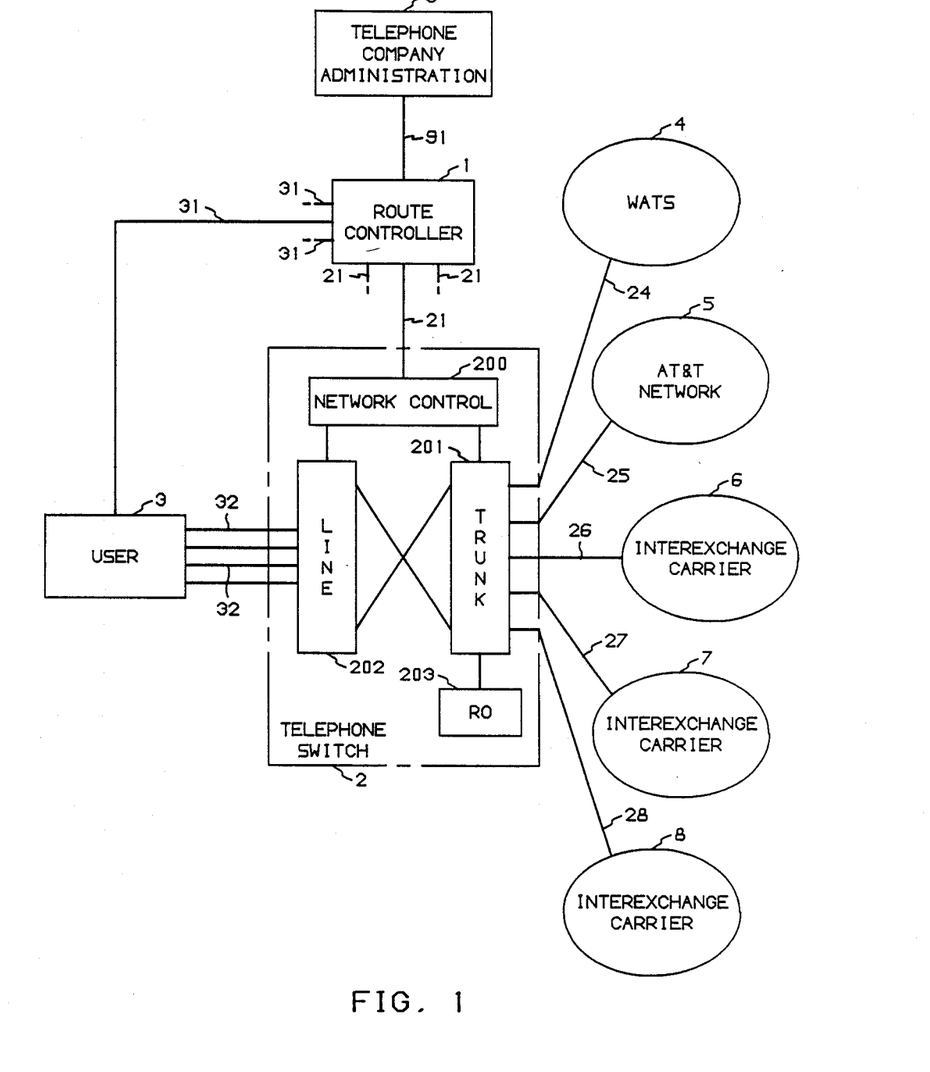
FIG. 1 is a block diagram of an interexchange carrier automatic route selection system embodying the principles of the invention.

Interexchange carrier automatic route selection (ARS) system 1, FIG. 1, enables telephone users to select multiple interexchange carrier resources for use in making telephone calls between local telephone exchange areas. Local telephone exchange areas each have telephone switches, such as telephone switch 2, interconnected with user lines 32 coupled with communication equipment of user 3. Telephone switch 2 may be any of a number of well-known types of telephone switching equipment such as AT&T 5ESS ® electronic switching systems wherein switch code language stored in network control 200 enables network control 200 to interconnect line equipment 202 and trunk equipment 201 to couple calling user 3 with called parties.

Telephone switch 2 may have a number of interexchange carrier resources that can be interconnected with ones of user lines 32 to establish call connections. Such interexchange carrier resources may be trunks 24 of the Wide Area Telephone Service (WATS) network 4 interconnecting various telephone switches in one or other local exchange areas and reorder (RO) trunks 203 used to couple a reorder tone to user lines 32. In addition, multiple interexchange carriers, such as the AT&T network 5 and interexchange carrier networks, 6, 7 and 8, may be available to serve telephone switch 2. Telephone switch 2 responds to information dialed by user 3 and switch code language previously stored in network control 200 by selectively interconnecting user lines 32 with the WATS network 4, RO trunks 203 and interexchange carrier networks 5 through 8.

Telephone switch 2 is coupled by data link 21 with route controller 1 which in turn is coupled by data links 31, 91 with users such as user 3 and with a telephone company administration unit 9. Route controller 1, FIG. 2, comprises a processor that may be a computer, such as an AT&T 3B2-400 and 3B2-310 simplex or duplex computer. Such computers need not be described in detail for an understanding of the invention and in general have a central processing unit 10, memory unit 11 and an interface unit 12 each connected by address, data and control leads to a bus 13. Interface unit 12 couples data links 91, 31 and 21 extending, respectively, to telephone company administration unit 9, users 3 and telephone switches 2 with bus 13 so that data may be exchanged with remote controller central processing unit 10 and memory unit 11. Computer terminal 14, which may be any of a number of well known computer terminals or personal computers, is coupled to interface unit 12 so that data may be entered into central processing unit 10 and memory unit 11 by input device 141 and read therefrom by use of output device 140. Telephone company administration unit 9 and users 3 have apparatus similar to computer terminal 14 for use in exchanging data with route controller 1.

In the operation of the embodiment of the invention, each user 3, FIG. 1, informs telephone company administration unit 9 that they would like to use interexchange carrier resources WATS network 4, RO trunks 203, AT&T network 5 and interexchange carriers 6, 7 and 8. Furthermore, user 3 would like access to two bands WATS-1 and WATS-2, FIG. 4, of WATS network 4 and access to the warning tone and priority features, AT&T-6 and AT&T-7 of AT&T network 5. Telephone company administration unit 9, FIG. 1, initiates a request to route controller 1 over data link 91 to install the ARS feature for user 3.

Figure 2:
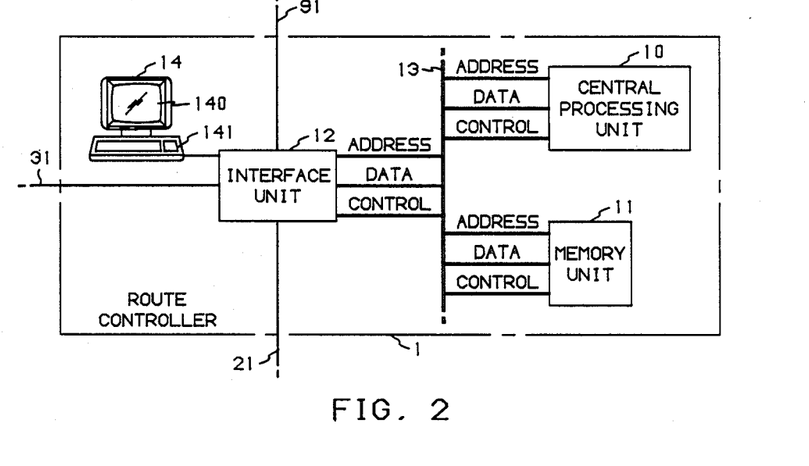
FIG. 2 illustrates the functional apparatus relationship of the route controller 1 set forth in FIG. 1.

If user 3 does not currently have the ARS feature, telephone company administration unit 9, in combination with route controller 1, generates a data base in route controller memory unit 11, FIG. 2, defining multiple interexchange carrier resources available for use by user 3. In particular, telephone company administration unit 9 establishes a list of available carriers 110, FIG. 4, in route controller memory unit 11 identifying bands WATS-1 and WATS-2, interexchange carriers 6, 7, and 8, AT&T network 5, warning tone and priority features AT&T-6 and AT&T-7 thereof and RO trunks. In addition, route controller 1 determines and gathers the switch code language used to control telephone switch 2, FIG. 1, interconnected with user lines 32 and assembles the code in the user data base generated for user 3. Route controller 1 also determines the type of computer terminal screen layout required by user 3 and queries telephone switch 2 serving user 3 for the specific switch code language that enables telephone switch 2 to interconnect user lines 32 with interexchange carrier facilities. Telephone company administration unit 9 also instructs route controller 1 that the ARS feature is to be activated at the date and time requested by user 3. After the generation of the user data base and the deposit of the assembled interexchange carrier resource information in the user data base, route controller 1 informs telephone company administration unit 9 of the successful creation of the user data base.

Thus, telephone company administration unit 9, FIG. 1, has established a user data base file in route controller 1 and compiled a list of the interexchange carrier resources that have been selected and are available for use by user 3. Route controller 1 has also determined the telephone switch code language that are required by the telephone switches 2 interconnected with user lines 32 to interconnect each user line 32 with the user selected interexchange carrier resources and filed the determined switch code languages in the created user data base file. In addition, route controller 1 defines screen layout information required by the user terminal to display data base records constructed by user 3 and enters the defined screen layout information in the user data base file. Telephone company administration unit 9 also enters the date and time into the created data base file that the user desires the ARS feature to be activated.

Upon activation of the ARS feature, user 3 accesses route controller 1 over data link 31 such that a communication path is established with central processing unit 10, FIG. 2, via interface unit 12 and data bus 13. Route controller central processing unit 10, interactive with user 3, enables user 3 to construct data base records of routes comprising ones of the interexchange carrier resources selected from the created data base. For example, user 3, FIG. 3, may designate a first time pattern between 9 and 11 a.m. for Monday through Friday wherein all calls are to be completed on AT&T network 5 using the priority feature AT&T-7. If user calls cannot be completed by priority feature AT&T-7 on AT&T network 5 or are of an improper priority, then user calls are to be completed on the facilities of interexchange carrier 7. Should both AT&T network 5 and interexchange carrier 7 be unavailable, then user 3 prefers that calls should be completed on the facilities of interexchange carrier 8. Finally, if AT&T network 5, and interexchange carriers 7 and 8 are unavailable, than all user calls are to be interconnected with RO trunks 203.

Figure 3:
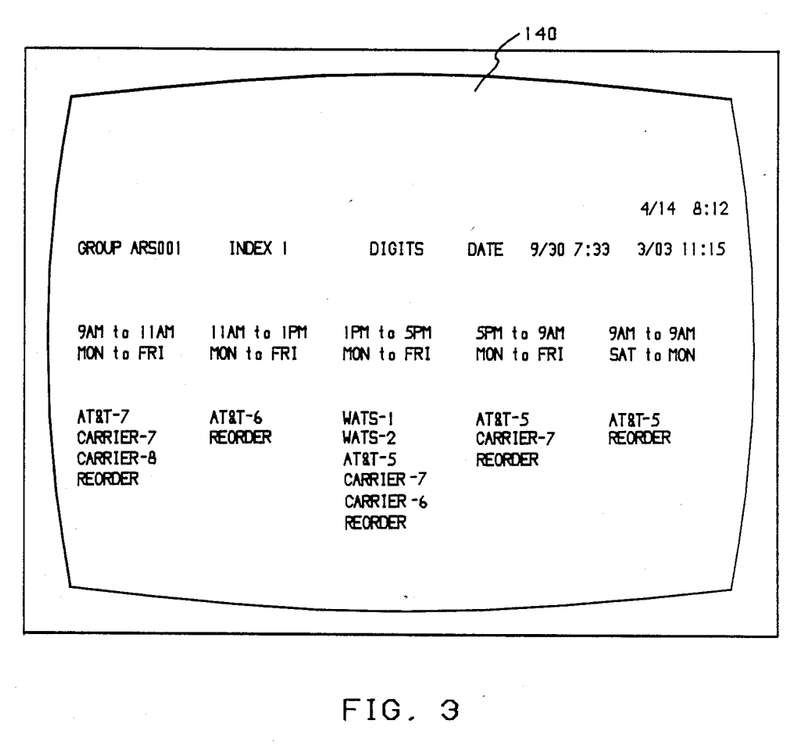
FIG. 3 illustrates a user terminal presentation of user constructed interexchange carrier routes.

The user constructed data base route record is displayed at the user terminal in format defined by the screen layout information set forth in the route controller data base file. User 3 may also construct a number of data base records each of which may be activated at a user designated date and time. For example, user 3 in interaction with route controller 1 may construct a data base record to be activated at 11 a.m. to 1 p.m. of each day, Monday through Friday, whereby all user calls are to be completed via AT&T network 5 in accordance with tone feature AT&T-6. If tone feature AT&T-6 of the AT&T network 5 is not available, then all calls are to be routed to RO trunks 203. During the busy time from 1 to 5 p.m. of each working day, Monday through Friday, user 3 may construct a route record wherein all calls are to be completed via WATS network 4 using zone WATS-1 as a first choice and zone WATS-2 as a second choice. If the WATS network 4 zones WATS-1 and 2 are not available, then the user calls are to be routed in accordance with the user selected order to AT&T network 5 and finally to interexchange carriers 7 and 6. As a last choice, calls that cannot be completed via WATS network 4, AT&T network 5 and interexchange carriers 7 and 6 are to be routed to RO trunks 203. After working hours on Monday through Friday, from 5 p.m. to 9 a.m. of the next day, all user calls are to be completed on AT&T network 5. If AT&T network 5 is not available, then user 3 calls are to be completed via interexchange carrier 7, and if neither interexchange carrier 7 nor AT&T network 5 is available, then all calls are to be routed to RO trunks 203. On the weekend, user 3 may construct a data base route record indicating that all user calls are to be completed using the AT&T network 5, and if AT&T network 5 is not available, then all user calls are to be routed to RO trunks 203.

User 3 may subsequently modify each user constructed data base route record by establishing communication with route controller 1 over data link 31. A user constructed data base route record, for example a data base route record from 1 to 5 p.m. on Monday through Friday, FIG. 3, may be selected by user 3 and displayed on the user terminal. User 3 may modify the displayed data base route record by deleting bands WATS-1 and WATS-2 and changing AT&T network 5 so that user calls may be completed on AT&T network 5, FIG. 4, using the priority feature AT&T-7. If calls cannot be completed using priority feature AT&T-7, then user calls are to be completed in order to interexchange carriers 7 and 8 and finally to reorder trunks RO 203. Thus, user 3 may display a previous user constructed data base route record and modify each displayed data base record designating deletions and changes and a date and time that the modified data base record is to be activated. Similarly, the data base route record for 11 a.m. to 1 p.m. on Monday through Friday may be modified to route calls to interexchange carrier 8 before routing the user calls to RO trunks 203.

Figure 4:
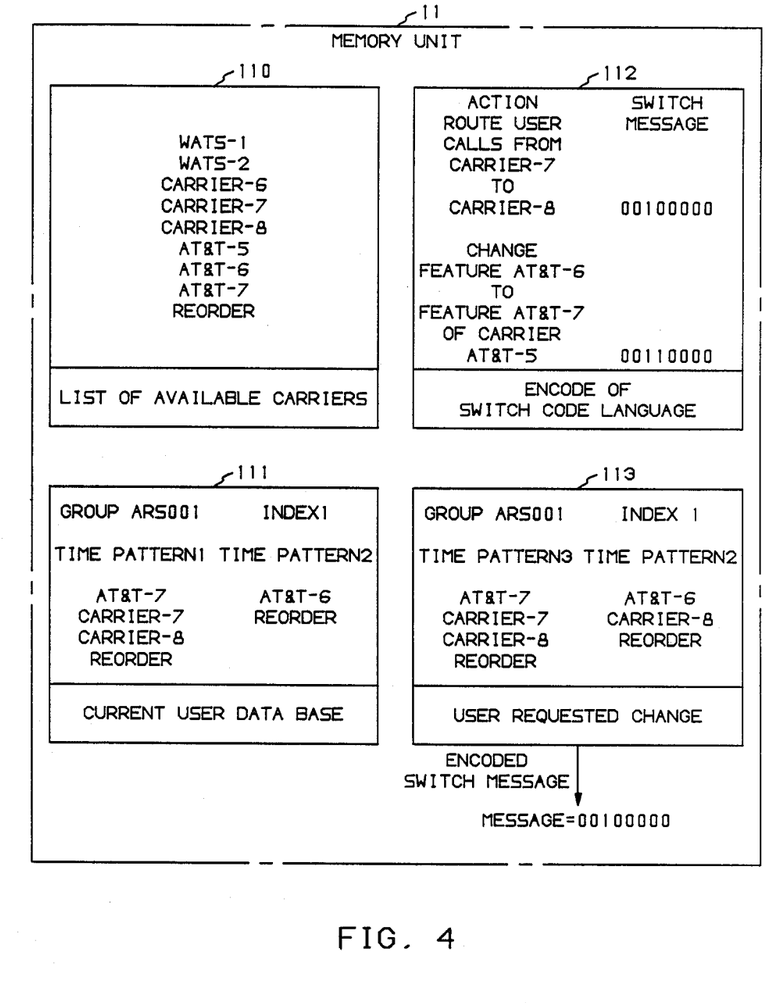
FIG. 4 sets forth an illustrative section of a data base in the memory of the route controller set forth in FIG. 1 defining multiple interexchange carrier resources available for use by a system user.

Central processing unit 10, FIG. 2, of route controller 1 encodes each of the user constructed and modified data base records into the switch code language required by each telephone switch 2, FIG. 1, to control network control 200 to interconnect user lines 32 with ones of the interexchange carrier resources set forth in activated ones of the user constructed data base route records. The switch code language, FIG. 4, is assembled in the telephone company administration unit 9 created data base located in route controller memory unit 11. For example, the user constructed data base route record may indicate that user calls are to be routed from interexchange carrier 7 to interexchange carrier 8 when the facilities of interexchange carrier 7 are unavailable. Route controller 1 encodes the telephone switch code language into a telephone switch code message such as binary code 00100000. If user 3 modifies a data base route record to change the AT&T-6 tone feature provided by AT&T network 5 to the AT&T-7 priority feature, route controller 1 encodes the specific switch code language into a telephone switch code message such as binary code 00110000.

Route controller 1 activates each user constructed data base route record at the date and time designated by user 3. Central processing unit 10, FIG. 2, searches the generated data base of user 3 in memory unit 11 to locate activated ones of the user constructed data base records. Upon locating an activated data base record, route controller 1 assembles the switch code language, FIG. 4, into encoded telephone switch messages required to control telephone switch 2, FIG. 1. The assembled messages are transmitted over data link 21 to network control 200 to control telephone switch 2. Telephone switch network control 200 is enabled by the transmitted telephone switch messages and is responsive to call digits dialed by user 3 for selecting ones of the interexchange carrier routes and interconnecting user lines 32 therewith in accordance with the user designated date and time and in the order set forth in each activated data base route record.

The method of operation enables users 3 to select multiple interexchange carrier resources serving telephone switch 2 interconnected with user lines 32. As earlier set forth, user 3 contacts telephone company administration unit 9 and requests that the ARS feature be made available for user service. Telephone administration unit 9 requests route controller 1, via data link 91, to generate a data base defining multiple interexchange carrier resources available for use by user 3. Route controller 1, FIG. 5, receives the request to add the ARS feature, step 1001, and determines if a data base, step 1002, exists for user 3. If a user data base does not currently exist, route controller central processing unit 10 adds a user data base, step 1003, to the system by generating an ARS data base for user 3, step 1004. Should user 3 already have the ARS feature, central processing unit 10 determines that user 3 wishes to change interexchange carrier resources for the existing data base. In changing or generating a new user data base, central processing unit 10, step 1005, gathers domain information relating to the interexchange carriers, the identity of the feature that user 3 has specified and help files that will subsequently help user 3 in creating data base records. Central processing unit 10, step 1006, also determines the switch code language for telephone switch 2 serving user 3 and gathers, step 1007, the switch code language for accessing telephone switch 2.

Figure 5:
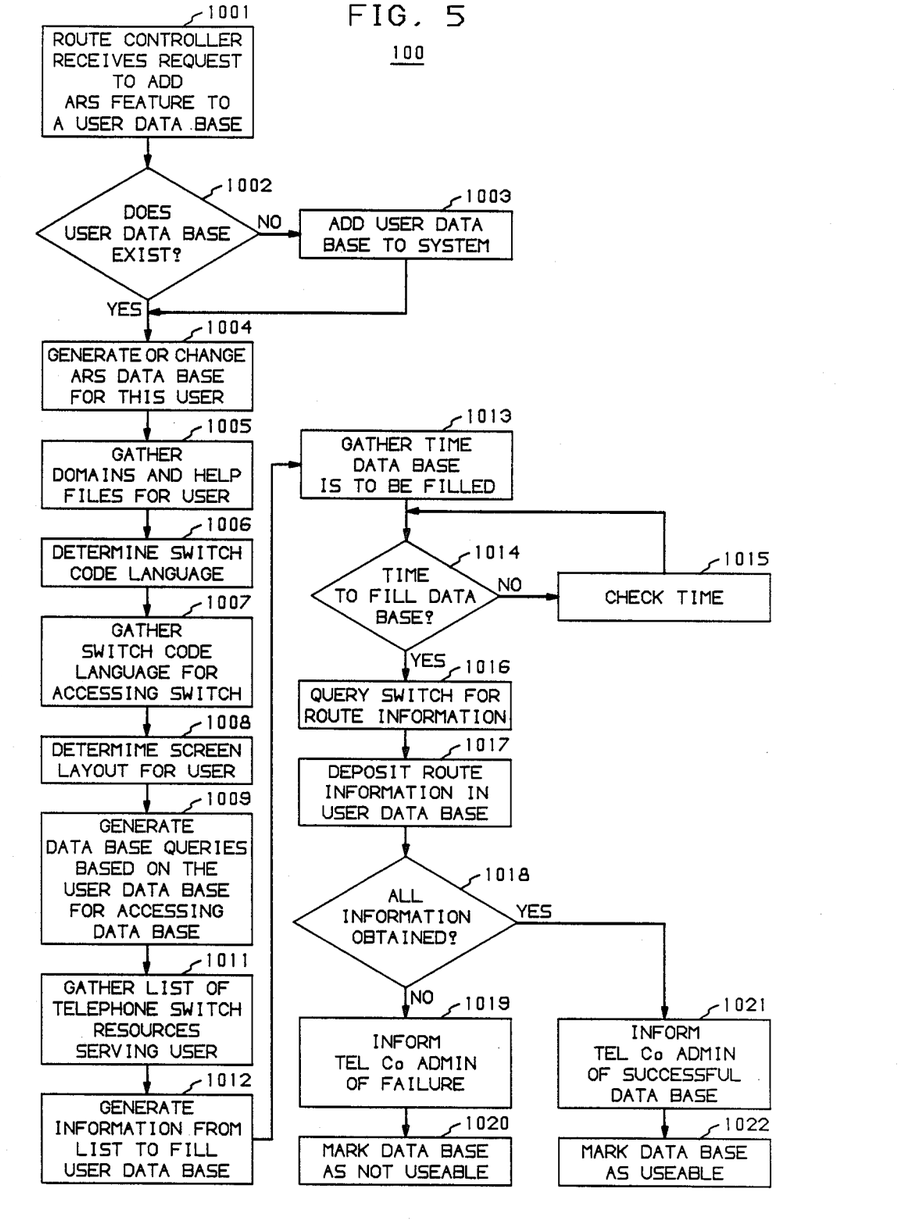
FIG. 5 through 8 illustrates flow charts of the operation of the interexchange carrier automatic route selection system set forth in FIG. 1 in accordance with the principles of the invention.

Route controller central processing unit 10, step 1008, further determines the screen layout for the terminal of user 3 and generates data base queries, step 1009, based on the user data base, that the user will require for accessing the generated data base established in memory unit 11. The telephone switch resources that serve user 3, step 1011, are gathered into a list so that central processing unit 10 may generate information from the list, step 1012, to fill the user data base. User 3 originally indicated the time to telephone company administration unit 9 that the ordered ARS feature is to be activated. Central processing unit 10 gathers the activation time, steps 1013, 1014 and 1015, and checks to see if it is time to fill the user data base. At the specified time, central processing unit 10 via data link 21, steps 1016 and 1017, queries telephone switch 2 for route information which is deposited in the user data base resident in memory unit 11. If all the data base information has been obtained for the user data base, steps 1018, 1021 and 1022, route controller 1, via data link 91 informs telephone administration unit 9 of the generation of a successful user data base and marks the data base as being usable by user 3. If the required information is not available, route controller 1, steps 1019 and 1020, informs telephone company administration unit 9 of the failure and marks the user data base as not being usable.

Once the user data base has been generated and marked available for use, user 3 is enabled to construct data base records of user selected interexchange carrier resources set forth in the generated user data base of route controller 1. User 3, in interaction with route controller 1, via data link 31, FIG. 1, constructs user data base records of interexchange carrier resources selected from the user generated data base. User 3 constructs a tree route, FIG 6, step 3101, by selecting ones of the interexchange carrier resources that are set forth in the generated user data base and which have been made available by telephone company administration unit 9 for use by user 3.

Figure 6:
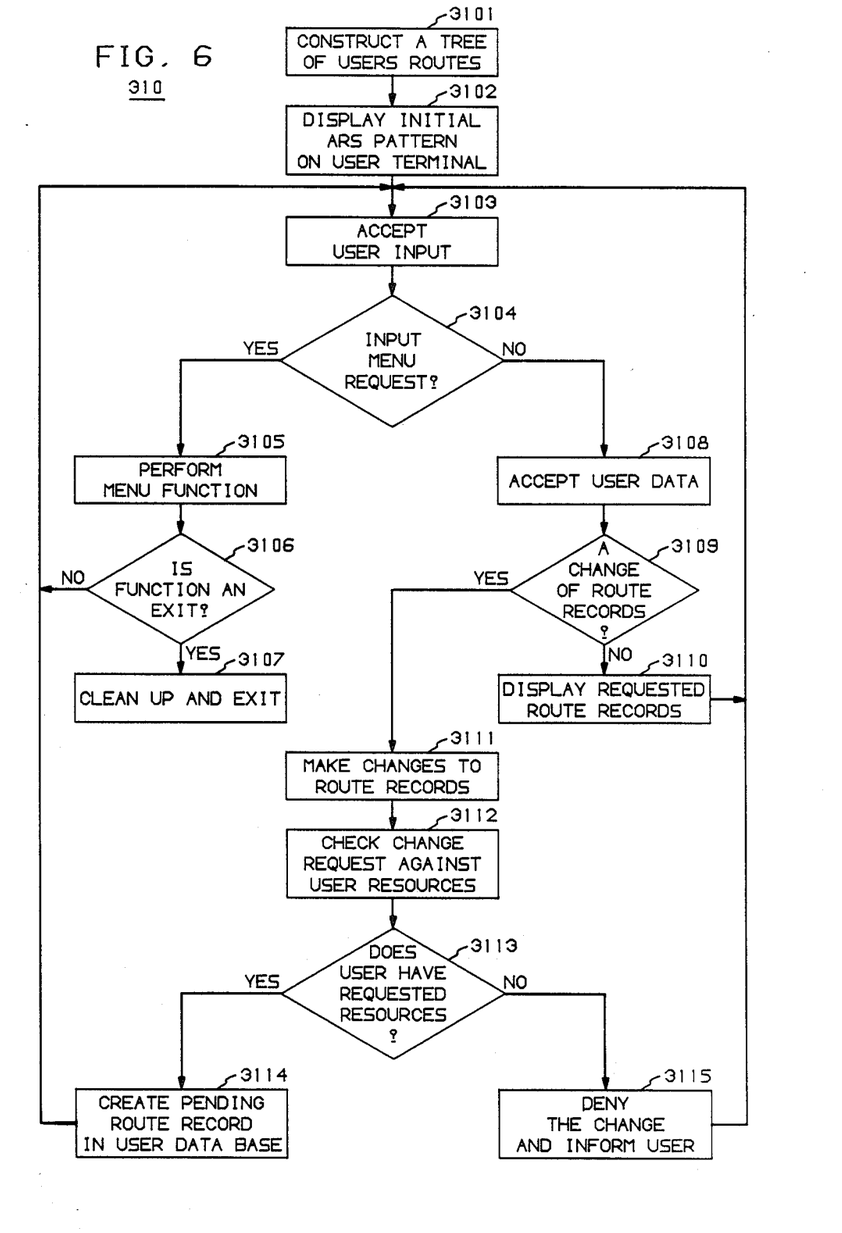

A connection is established by user 3 over data link 31 with route controller 1. The current tree patterns of routes, step 3102, previously selected by user 3 are displayed on the user terminal. Central processing unit 10 of route controller 1, in response to user 3 accepts user input, steps 3103 and 3104, for request for service and asks if this is a request for an input menu. The input menu may indicate help, insert changes in previously selected routes, delete pending routes, expand display fields, abort the current operation, exit or explain other functions of the ARS service available to the user. If user 3 requests a menu function, route controller central processing unit 10, steps 3105 and 3106, performs the selected function and if the exit function has been selected by the user, step 3107, cleans up the files and exits. On other selected menu functions, central processing unit 10 may return to accept user input, step 3103.

If there is not a request for a menu function, route controller central processing unit 10 accepts user data, steps 3108 and 3109, and asks if there is to be a change of or addition to the user route records. When the user does not want to make a change or would like to review the route records, route controller 1 transmits information to user 3 to display requested ones of previously constructed route records, step 3110. User 3 may wish to construct new or make changes to existing route records, step 3109. Route controller central processing unit 10, in interaction with user 3, responds to the user input by making changes to an existing or constructing a new route record, steps 3111 and 3112, and checking the change requests against one of the interexchange carrier resources that have been made available to user 3. If user 3 has the requested interexchange carrier resources, steps 3113 and 3114, route controller central processing unit 10 creates a pending route record in the memory unit data base that was created for user 3 and returns to step 3103 to await further user input. When the user requested interexchange carrier resources are not in the user created data base or the requested resources are not available, route controller 1, steps 3115 and 3103, denies the user's request, informs user 3 of the denial and awaits further user input.

Figure 7:
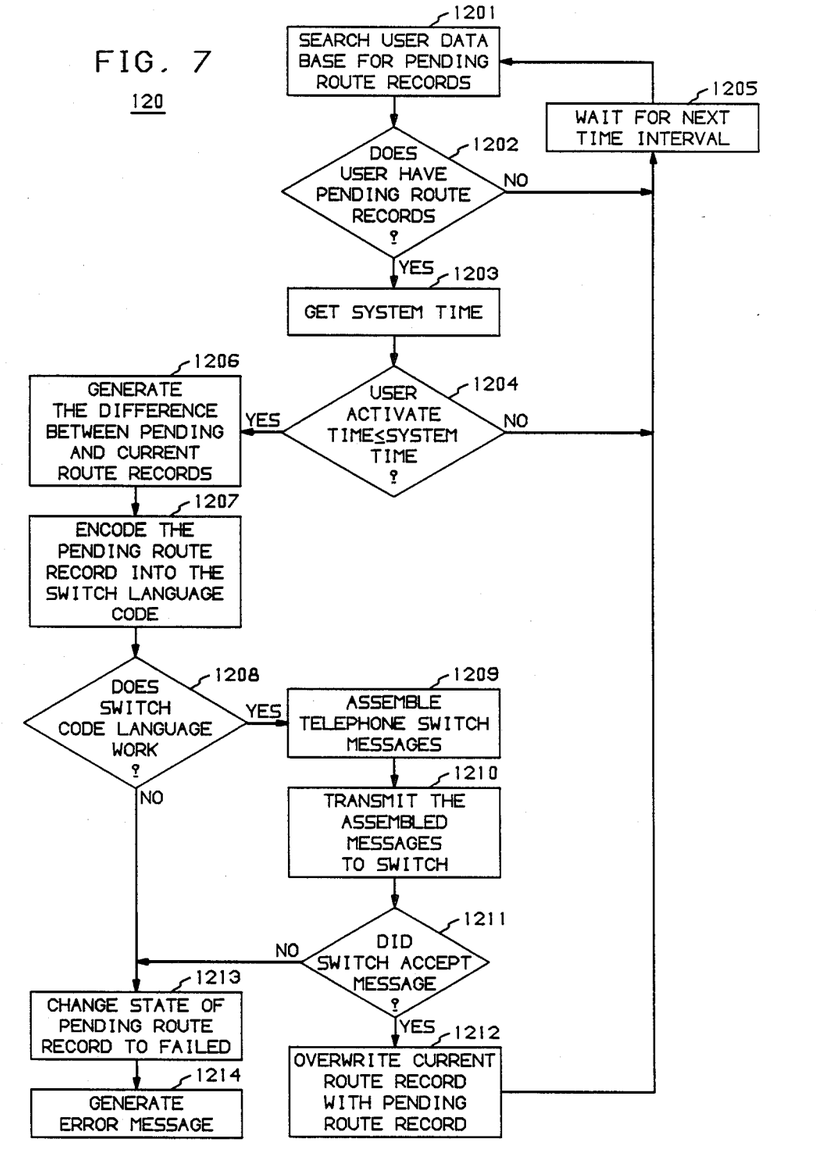

Route controller 1 initiates periodic searches of memory unit 11, FIG. 7, to identify pending user constructed route records, step 1201. If the user does not have any route records pending, step 1202, central processing unit 10 waits for a predetermined interval of time, step 1205, and repeats the search sequence. When it is determined that user 3 has pending route records, central processing unit 10 checks the current system time, steps 1203 and 1204, and determines whether the user specified time when the pending route record is to be activated is equal to or less than the current system time. When the user specified time of activation is greater than the current system time, central processing unit 10, steps 1204 and 1205, repeats the search sequence after a predetermined interval of time.

When route controller 1 determines that it is time to activate the pending user route record, central processing unit 10, step 1206, generates the difference between pending and current route records for user 3. The pending route record, step 1207, is encoded into the appropriate switch code language and tested as to proper operation. If the test fails, steps 1208, 1213 and 1214, central processing unit 10 changes the state of the pending route record to failed and generates an error message which is displayed on display unit 140 of route controller computer unit 14, FIG. 2.

Upon a successful test, steps 1209 and 1210, FIG. 7, central processing unit 10 assembles the switch code language into telephone switch messages required to control telephone switch 2 serving user 3 to interconnect user lines 32 with the interexchange carriers resources set forth in the user constructed pending route record and transmits the assembled telephone switch messages to telephone switch 2. If the transmitted telephone switch messages are accepted by telephone switch 2, step 1211, central processing unit 10 overwrites the current user route record stored in memory unit 11 with the pending user route record, step 1212, and returns to the search sequence, steps 1201 and 1205. Should telephone switch 2, step 1211, fail to accept the transmitted telephone switch messages, central processing unit 10, steps 1213 and 1214, changes the state of the pending route record to failed and generates an error message on route controller computer terminal 14. Upon receipt of the transmitted telephone switch messages, FIG. 1, network control 200 records the user constructed route records in the memory thereof for future use in serving user 3.

User 3, in originating telephone calls, dials digits identifying called parties over user lines 32 into telephone switch 2. Network control 200 receives the dialed digits, FIG. 8, step 2001, and determines if user 3 has the ARS feature from information previously received from route controller 1. If a user, such as user 3, does not have the ARS feature, network control 200 of telephone switch 2, FIG. 1, interconnects line equipment 202 with trunk equipment 201 to complete the user 3 dialed calls to the called parties in accordance with the normal office dialing plan, FIG. 8, step 2003, assigned telephone switch 2.

If user 3 has the ARS feature, steps 2004 and 2005, network control 200 retrieves the user constructed route record information from memory and the current date and time of day. Using the retrieved information, network control 200 selects the appropriate user constructed route record, step 2006, based on the day of the week and time of day and chooses the first interexchange carrier resource, step 2007, specified by user 3. For example, network control 200 may determine that it is 10 a.m. on a Monday, FIG. 3, and all incoming calls from user 3 are to be completed on AT&T network 5 using the priority feature AT&T-7. In accordance with the user 3 constructed route record, network control 200, FIG. 8, step 2008, attempts to connect the calling user line 32 with AT&T network 5 using the priority feature AT&T-7. If feature AT&T-7 is available, step 2013, network control 200 interconnects user line 32 with AT&T network 5 using the priority AT&T-7 feature in accordance with the activated data base route previously constructed by user 3 in route controller 1 to complete the call.

Figure 8:
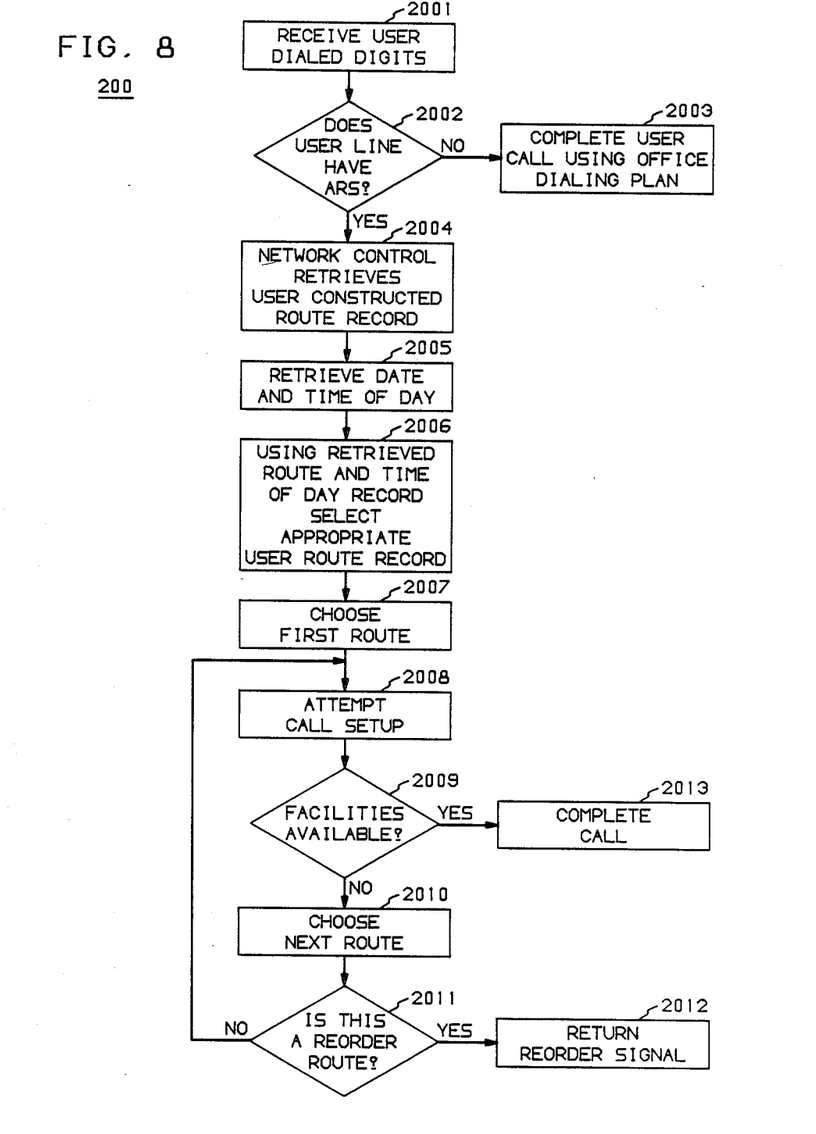

If all of the AT&T network 5 facilities providing the priority feature AT&T-7 are busy, step 2009, network control 200 chooses the next interexchange carrier resource, for example, interexchange carrier 7, step 2010, in accordance with the appropriate user 3 constructed route record, FIG. 3. If the next interexchange carrier resource is not a reorder route, step 2011, network control 200 repeats steps 2008, 2009 and 2013 to complete the call connection via the facilities of interexchange carrier 7. When the user constructed route record indicates that calls are to be routed to reorder trunks 203, steps 2011 and 2012, network control 200 functions to interconnect user line 32, FIG. 1, through line equipment 202 and trunk equipment 201 with one of the reorder trunks 203.

Thus, route controller 1, in operation of the ARS feature, generates a data base record of user selected interexchange carrier resources. In interaction with users, such as user 3, route controller 1 creates user constructed data base route records of user selected interexchange carrier resources and encodes them into telephone switch messages enabling telephone switch 2 to interconnect user lines to ones of the interexchange carrier resources in accordance with the user constructed data base records.

We claim:

1. A system for enabling users to select multiple interexchange carrier resources serving telephone switches interconnected with user lines comprising
means interactive with the users for creating data base records of user selected interexchange carrier resources and for encoding said user created data base records into telephone switch code messages enabling the telephone switches to selectively interconnect the user lines with ones of the interexchange carrier resources in accordance with the user created data base records.

2. The interexchange carrier resources selection system set forth in claim 1 wherein said creating and encoding means comprises means for generating a data base defining multiple interexchange carrier resources available for use by a user.

3. The interexchange carrier resources selection system set forth in claim 2 wherein said creating and encoding means also comprises means interactive with the user for constructing ones of said data base records of ones of the interexchange carrier resources selected by the user from said generated data base.

4. The interexchange carrier resources selection system set forth in claim 3 wherein said creating and encoding means also comprises means for encoding said user constructed data base records into telephone switch code messages and transmitting said encoded messages to ones of the telephone switch interconnected with the user lines.

5. The interexchange carrier resources selection system set forth in claim 4 wherein said creating and encoding means further comprises means enabled by said telephone switch code messages for selectively interconnecting the user lines with interexchange carrier routes defined by said user constructed data base records of the selected interexchange carrier resources.

6. A system for enabling users to select multiple interexchange carrier resources serving telephone switches interconnected with user lines comprising means for generating a data base defining ones of the multiple interexchange carrier resources available for use by a user, means interactive with the user for constructing data base records of ones of the interexchange carrier resources selected by the user from said generated data base, means for encoding said user constructed data base records into telephone switch code messages and transmitting said encoded messages to one of the telephone switches interconnected with the user lines, and means enabled by said telephone switch code messages for selectively interconnecting the user lines with interexchange carrier routes defined by said user constructed data base records of the interexchange carrier resources.

7. The interexchange carrier resources selection system set forth in claim 6 wherein said generating means comprises means for establishing a user data base file, means for compiling a list of the interexchange carrier resources available for use by the user in said established user data base file, means for determining switch code languages used in controlling the telephone switches to interconnect the user lines with said compiled interexchange carrier resources and filing said determined switch code languages in said established data base file, means for defining screen layout information for a user computer terminal in displaying said constructed data base records and entering said defined screen layout information in said established user data base file, and means for activating said established user data base file at a predetermined time.

8. The interexchange carrier resources selection system set forth in claim 7 wherein said constructing means comprises means interactive with the user for constructing data base records of routes comprising ones of the interexchange carrier resources selected by the user from said compiled data base file list, means for displaying said user constructed data base record interexchange carrier routes, means for enabling the user to modify each of said displayed user constructed data base route records, and means for user designating date and time of activation of each said data base route record.

9. The interexchange carrier resources selection system set forth in claim 8 wherein said encoding and transmitting means comprises means for searching said generated data base to locate activated ones of said user constructed data base route records, means for assembling ones of said determined switch code languages into encoded telephone switch messages required to control the telephone switches to interconnect the user lines to ones of the interexchange carrier resources in accordance with each activated data base route record, and means for transmitting said assembled telephone switch messages to the telephone switches.

10. The interexchange carrier resources selection system set forth in claim 9 wherein said selectively interconnecting means comprises means enabled by said transmitted telephone switch messages and responsive to user dialed digits for selecting ones of the interexchange carrier routes to interexchange the user lines therewith in accordance with said user designated date and time and in the order set forth in each activated data base route record.

11. A system for enabling users to select multiple interexchange carrier resources serving telephone switches interconnected with user lines comprising means for establishing a user data base, means for compiling a list of interexchange carrier resources available for use by the user in said established user data base, means for determining switch code languages used in controlling the telephone switches to interconnect the user lines with said compiled interexchange carrier resources and filing said determined switch code languages in said established user data base, means for activating said established user data base file at a time selected by the user, means interactive with the user for constructing data base records of routes comprising ones of the interexchange carrier resources selected by the user from said compiled data base list, means for displaying said user constructed data base record of interexchange carrier routes, means for enabling the user to modify each of said displayed user constructed data base route records, means for user designating date and time of activation of each said data base route record, means for searching said user data base to locate activated ones of said user constructed data base route records, means for assembling ones of said determined switch code languages into encoded telephone switch messages required to control the telephone switches to interconnect the user lines to ones of the interexchange carrier resources in accordance with each activated data base route record, means for transmitting said assembling telephone switch messages to the telephone switches, and means enabled by said transmitted telephone switch messages and responsive to user dialed digits for selecting ones of the interexchange carrier routes to interconnect the user lines therewith in accordance with said user designated date and time and in the order set forth in each activated data base route record.

12. A method of enabling users to select multiple interexchange carrier resources serving telephone switches interconnected with user lines comprising the steps of creating data base records of user selected interexchange carrier resources, and encoding said user created data base records into telephone switch messages enabling the telephone switches to selectively interconnect the user lines with ones of the interexchange carrier resources in accordance with the user created data base records.

13. The interexchange carrier resources selection method set forth in claim 12 wherein said creating step comprises the step of generating a data base defining multiple interexchange carrier resources available for use by a user.

14. The interexchange carrier resources selection method set forth in claim 13 wherein said creating step also comprises the step constructing in interaction with the user data base records of ones of the interexchange carrier resources selected by the user from said generated data base.

15. The interexchange carrier resources selection method set forth in claim 14 wherein said encoding step comprises the step of encoding said user constructed data base records into telephone switch code messages and transmitting said encoded messages to the telephone switches interconnected with the user lines.

16. The interexchange carrier resources selection method set forth in claim 15 wherein said encoding step also comprises the step selectively interconnecting the user lines with interexchange carrier routes defined by said user constructed data base records of interexchange carrier resources.

17. A method of enabling users to select multiple interexchange carrier resources serving telephone switches interconnected with user lines comprising the steps of generating a data base defining ones of the multiple interexchange carrier resources available for use by a user, constructing data base records by the user of ones of the defined interexchange carrier resources selected by the user from said generated data base, encoding said user constructed data base records into telephone switch code messages and transmitting said encoded messages to ones of the telephone switches interconnected with the user lines, and selectively interconnecting the user lines with interexchange carrier routes defined by said user constructed data base records of interexchange carrier resources.

18. The interexchange carrier resources selection method set forth in claim 17 wherein said generating step comprises the steps of establishing a user data base, compiling a list of the interexchange carrier resources available for use by the user in said established user data base, determining switch code languages used in controlling the telephone switches to interconnect the user lines with said compiled interexchange carrier resources and filing said determined switch code languages in said established user data base, defining screen layout information for a user terminal in displaying said constructed data base records and entering said defined screen layout information in said established user data base, and activating said established user data base at a predetermined time specified by the user.

19. The interexchange carrier resources selection method set forth in claim 18 wherein said constructing step comprises the steps of constructing the data base records in interaction with the user of routes comprising ones of the interexchange carrier resources selected by the user from said compiled data base, displaying said user constructed data base record of interexchange carrier routes, enabling the user to modify each of said displayed user constructed data base route records, and designating a date and time by the user of an activation of each said data base route record.

20. The interexchange carrier resources selection method set forth in claim 19 wherein said encoding and transmitting step comprises the steps of searching said user data base to locate activated ones of said user constructed user data base route records, assembling ones of said determined switch code languages into encoded telephone switch messages required to control the telephone switches to interconnect the user lines to ones of the interexchange carrier resources in accordance with each activated data base route record, and transmitting said assembled telephone switch messages to the telephone switches.

21. The interexchange carrier resources selection method set forth in claim 20 wherein said selectively interconnecting step comprises the step of selecting ones of the interexchange carrier routes in response to said transmitted telephone switch messages and user dialed digits to interconnect the user lines therewith in accordance with said user designated date and time and in the order set forth in each activated data base route record.

22. A method of enabling users to select multiple interexchange carrier resources serving telephone switches interconnected with user lines comprising the steps of establishing a user data base, compiling a list of the interexchange carrier resources available for use by the user in said established data base, determining switch code languages used in controlling the telephone switches to interconnect the user lines with said compiled interexchange carrier resources and filing said determined switch code languages in said established user data base, activating said established user data base at a predetermined time specified by the user, constructing data base records interactive with the user of routes comprising ones of the interexchange carrier resources selected by the user from said compiled user data base, displaying said user constructed data base route records, enabling the user to modify each of said displayed user constructed data base route records, designating a date and time by the user of an activation of each said user constructed data base route record, searching said compiled user data base to locate activated ones of said user constructed data base route records, assembling ones of said determined switch code languages into encoded telephone switch messages required to control the telephone switches to interconnect the user lines to ones of the interexchange carrier resources in accordance with each activated data base route record, transmitting said assembled telephone switch messages to the telephone switches, and selecting ones of the interexchange carrier routes in response to said transmitted telephone switch messages and user dialed digits to interconnect the user lines therewith in accordance with said user designated date and time and in the order set forth in each activated data base route record.

* * * * *